US012592617B2

(12) United States Patent
Eich et al.

(10) Patent No.: US 12,592,617 B2
(45) Date of Patent: Mar. 31, 2026

(54) DEVICE FOR DETERMINING A TORQUE IN A DRIVETRAIN OF AN AT LEAST PARTIALLY ELECTRICALLY OPERATED MOTOR VEHICLE

(71) Applicant: Schaeffler Technologies AG & Co. KG, Herzogenaurach (DE)

(72) Inventors: Jürgen Eich, Bühl (DE); Björn Stehle, Kappelrodeck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 385 days.

(21) Appl. No.: 18/012,731

(22) PCT Filed: May 28, 2021

(86) PCT No.: PCT/DE2021/100462
§ 371 (c)(1),
(2) Date: Dec. 23, 2022

(87) PCT Pub. No.: WO2022/002294
PCT Pub. Date: Jan. 6, 2022

(65) Prior Publication Data
US 2023/0246524 A1　Aug. 3, 2023

(30) Foreign Application Priority Data
Jul. 1, 2020　(DE) ......................... 102020117262.1

(51) Int. Cl.
　H02K 11/24　　(2016.01)
　H02K 7/00　　(2006.01)
　H02K 11/21　　(2016.01)
(52) U.S. Cl.
　CPC ............. H02K 11/24 (2016.01); H02K 7/006 (2013.01); H02K 11/21 (2016.01)

(58) Field of Classification Search
CPC ......... H02K 7/006; H02K 11/24; H02K 5/173
See application file for complete search history.

(56) References Cited

U.S. PATENT DOCUMENTS 5,691,584 A * 11/1997 Toida ...................... H02K 7/116
　　　　　　　　　　　　　　　　　　　　310/67 R
2013/0337959 A1* 12/2013 Suzuki ................. H02K 5/1732
　　　　　　　　　　　　　　　　　　　　475/149
(Continued)

FOREIGN PATENT DOCUMENTS

DE　　　10026959 A1 *　2/2001　............... B61C 9/46
DE　102010030365　　12/2011
(Continued)

OTHER PUBLICATIONS

English Translation of DE 10026959 A1 (Year: 2001).*

*Primary Examiner* — Terrance L Kenerly
*Assistant Examiner* — Theodore L Perkins
(74) *Attorney, Agent, or Firm* — Volpe Koenig

(57) ABSTRACT

A device for determining a torque in a drivetrain of an at least partially electrically operated motor vehicle is provided, having a first electric motor with a first rotor rotatably mounted in at least two rolling bearings spaced in the axial direction. The first rotor is operatively connected to at least a first vehicle wheel to be driven by the first electric motor. The first rolling bearing has a first angular position sensor and the second rolling bearing has a second angular position sensor, the sensors each generating a signal that represents the angular position of the first rotor at the particular bearing point. The signals are transmitted to a vehicle controller, in which the torque of the first electric motor applied to the first rotor is determined from the difference between the angular positions and is provided to control the motor vehicle.

7 Claims, 4 Drawing Sheets

(56) References Cited

U.S. PATENT DOCUMENTS

| | | | |
|---|---|---|---|
| 2014/0335999 A1* | 11/2014 | Knoblauch | B60K 17/165 |
| | | | 477/5 |
| 2016/0216168 A1* | 7/2016 | Itomi | G01L 5/221 |
| 2016/0301281 A1* | 10/2016 | Ihben | H02K 15/16 |
| 2018/0003578 A1 | 1/2018 | Leonard et al. | |
| 2018/0244257 A1* | 8/2018 | Kneitz | B60W 10/06 |
| 2020/0116580 A1 | 4/2020 | Appleton et al. | |

FOREIGN PATENT DOCUMENTS

| | | |
|---|---|---|
| DE | 102017207242 | 1/2018 |
| DE | 102018209914 | 12/2019 |
| DE | 102019213245 | 4/2020 |
| EP | 3045885 | 7/2016 |
| EP | 3297862 | 9/2021 |

* cited by examiner

DEVICE FOR DETERMINING A TORQUE IN A DRIVETRAIN OF AN AT LEAST PARTIALLY ELECTRICALLY OPERATED MOTOR VEHICLE

CROSS-REFERENCE TO RELATED APPLICATIONS

This application is the U.S. National Phase of PCT Appln. No. PCT/DE2021/100462, filed May 28, 2021, which claims the benefit of German Patent Appln. No. 10 2020 117 262.1, filed Jul. 1, 2020, the entire disclosures of which are incorporated by reference herein.

TECHNICAL FIELD

The present disclosure relates to a device for determining a torque in a drivetrain of an at least partially electrically operated motor vehicle, comprising at least one first electric motor having a first rotor, the first rotor being rotatably mounted in at least two rolling bearings that are mutually spaced in the axial direction of the rotor, specifically a first rolling bearing and a second rolling bearing, and the first rotor of the first electric motor being operatively connected to at least one first vehicle wheel so that the first electric motor drives the at least one vehicle wheel.

BACKGROUND

In order to control and regulate an electrically operated motor vehicle, there is a continuing need to capture the torques output by the electric motors as precisely as possible. Usually very high requirements are placed on torque accuracies. This applies in particular to applications in which functionally separate electric motors are used for the motor vehicle wheels on a motor vehicle axle, since unwanted torque differences between a left wheel and a right wheel can lead to a yaw moment and thus affect the tracking of the vehicle.

In today's motor vehicle drives, the torque is typically determined indirectly by estimating the torque from the process data of concerned system elements (e.g., air mass and/or injection quantity in combustion engines, actuation position of a clutch, electrical currents in electrical machines, etc.). Such torque determination cannot meet requirements for determination accuracy in the applications outlined above.

SUMMARY

It is therefore the object of the disclosure to provide a device for determining a torque in a drivetrain of an at least partially electrically operated motor vehicle that is improved with regard to the required accuracy of torque determination.

The object is achieved by a device for determining a torque in a drivetrain of an at least partially electrically operated motor vehicle, comprising at least one first electric motor having a first rotor, the first rotor being rotatably mounted in at least two rolling bearings that are mutually spaced in the axial direction of the rotor, specifically a first rolling bearing and a second rolling bearing, and the first rotor of the first electric motor being operatively connected to at least one first vehicle wheel so that the first electric motor drives the at least one vehicle wheel, wherein the first rolling bearing has a first angular position sensor and the second rolling bearing has a second angular position sensor, which each generate a signal representing the angular position of the first rotor at a bearing point, and the signals representing the angular positions are transmitted to a vehicle controller, in which the torque of the first electric motor which is applied to the first rotor is determined from the difference in the angular positions and is provided for controlling the motor vehicle.

This achieves the advantage of enabling very compact and precise determination of torque output by the electric motor to a vehicle wheel. The torque is determined at the rotor of an electric motor by two rolling bearings, each having an angular position sensor. From the difference between the angular positions measured in these rolling bearings, the torsion angle of the rotor is determined by a vehicle controller, which in turn is considered a measure of the torque applied to the rotor, taking into account the rotor stiffness.

In order to be able to determine the torsion angle of the rotor between the two rolling bearings with sufficient resolution and accuracy, it is particularly preferred to arrange the two rolling bearings on the rotor at the greatest possible axial distance from one another.

For the purposes of this application, motor vehicles are land vehicles that are moved by machine power without being restricted to railroad tracks.

The disclosure is preferred for use in electric motor vehicles, also referred to as electric vehicles (EV), which are driven by at least one electric motor, the electric motor drawing energy from an electric storage unit (battery).

The subject matter of the disclosure can also be used advantageously for a hybrid electric vehicle, also referred to as a hybrid electric vehicle (HEV). An HEV is an electric vehicle that is driven by at least one electric motor and another energy converter and draws energy from the electrical storage unit (battery) thereof as well as an additional fuel.

In the context of this application, the drivetrain of a motor vehicle is understood to mean all components that generate the power for driving the motor vehicle in the motor vehicle and transmit it to the road via the vehicle wheels.

An electric motor—also referred to as an electric machine—is used to convert electrical energy into mechanical energy and/or vice versa, and generally comprises a stationary part, referred to as a stator or armature, and a part, referred to as a rotor, arranged movably relative to the stationary part. In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

A rotor is the rotating (spinning) part of an electric machine. In particular, a rotor is used when there is also a stator.

Rolling bearings can be used in particular to enable rotary movements with the lowest possible frictional losses. Rolling bearings can be used in particular to affix and/or mount axles and shafts, and, depending on the design, absorb radial and/or axial forces and simultaneously enable the rotation of the shaft or the components mounted on an axle in this way. For this purpose, rolling elements are arranged between an inner ring and an outer ring of the rolling bearing. Between these three main components—inner ring, outer ring and the rolling elements—it is usually mainly rolling friction that occurs within the rolling bearing. Since the rolling elements in the inner and outer ring can preferably roll on hardened steel surfaces with optimized lubrication, the rolling friction of such bearings is relatively low. A rolling bearing can be designed in one or more parts.

The inner ring can in particular connect the shaft accommodating rolling bearings to the rolling bearing or the rolling elements. In particular, the shaft can be connected to the side of the lateral surface of the inner ring facing the shaft, with the rolling elements of the rolling bearing rolling on the inner ring raceway opposite this lateral surface. The inner ring can be made of a metallic and/or ceramic material. In principle, it is conceivable to design the inner ring in one piece or in multiple pieces, in particular in two pieces.

The rolling elements can roll within the rolling bearing, in particular on the inner ring raceway of the inner ring. For this purpose, the surface of the inner ring raceway can advantageously be designed to be correspondingly abrasion-resistant, for example also by means of a corresponding surface treatment process and/or by applying a corresponding additional layer of material. The inner ring raceway can be flat or profiled. A profiled design of the inner ring raceway can be used, for example, to guide the rolling elements on the inner ring raceway. On the other hand, a planar formation of the inner ring raceway can, for example, allow a certain axial displaceability of the rolling elements on the inner ring raceway.

The outer ring can, in particular, connect the bearing arrangement accommodating rolling bearings to the rolling bearing or the rolling elements. In particular, the bearing arrangement can be connected to the side of the lateral surface of the outer ring facing the bearing arrangement, with the rolling elements of the rolling bearing rolling on the outer ring raceway opposite this lateral surface. The outer ring can be made of a metallic and/or ceramic material. In principle, it is conceivable to design the outer ring in one piece or in multiple pieces, in particular in two pieces.

The rolling elements can roll within the rolling bearing, in particular on the outer ring raceway of the outer ring. For this purpose, the surface of the outer ring raceway can advantageously be designed to be abrasion-resistant, for example by means of a corresponding surface treatment process and/or by applying a corresponding additional layer of material. The outer ring raceway can be flat or profiled. A profiled design of the outer ring raceway can be used, for example, to guide the rolling elements on the outer ring raceway. On the other hand, a planar shape of the outer ring raceway can, for example, allow a certain axial displaceability of the rolling elements on the outer ring raceway.

Depending on the type of rolling bearing, the rolling elements have the shape of a ball or a roller. They roll on the raceways of the rolling bearing and have the task of transmitting the force acting on a radial rolling bearing from the outer ring to the inner ring and vice versa. In an axial rolling bearing, the rolling elements transmit the forces acting on the axial rolling bearing between the running disks. Roller-like rolling elements are also referred to as roller rolling elements and spherical rolling elements as bearing balls.

Roller-like rolling elements can be selected, for example, from the group of symmetrical spherical rollers, asymmetrical spherical rollers, cylindrical rollers, needle rollers and/or tapered rollers.

Rolling elements can be guided and spaced apart in a cage or by rolling element spacers. In principle, it is also conceivable to design a rolling bearing without a cage, which is also referred to as a full-complement rolling bearing. In full-complement rolling bearings, adjacent rolling elements can contact each other.

A rolling bearing can have a cage, with the cage guiding the rolling elements. The cage is designed in such a way that the rolling element balls and/or the rolling element rollers are spaced apart from one another so that, for example, the friction and heat development of the rolling elements is kept as low as possible. Furthermore, the cage keeps the rolling element balls and/or rolling element rollers at a fixed distance from one another during rolling, as a result of which an even load distribution can be achieved. The cage can be made in one piece or in multiple pieces.

An angular position sensor generates an in particular electrical signal, which represents the angular position of a rotor at a respective bearing point or at the corresponding rolling bearing. According to the disclosure, the angular position sensor is arranged on and/or in the rolling bearing.

The signals representing the angular positions are transmitted from the angular position sensor to a vehicle controller, in which the torque of the corresponding electric motor which is applied to a rotor is determined from the difference between the angular positions and is provided for controlling the motor vehicle.

Angular position sensors which are arranged in a rolling bearing are known per se from the prior art.

An angular position sensor can, for example, be based on an inductive sensor principle or a magnetic field sensor. For example, an angular position sensor can include a rotary encoder arranged on a first bearing ring and at least one sensor disposed opposite the rotary encoder. The rotary encoder preferably constitutes a material measure for the angle of rotation. The sensor is arranged in a rotationally fixed manner on the second bearing ring. The rotary encoder is arranged on the first bearing ring in a rotationally fixed manner.

The rotary encoder preferably comprises at least one north pole and one south pole for generating magnetic fields. The rotary encoder is preferably designed as an encoder disk. Depending on the application, the rotary encoder has different polarizations and magnetizations.

The at least one sensor is preferably a magnetic field sensor. The at least one sensor of the sensor unit is preferably a Hall sensor. The rotary encoder and the at least one sensor are preferably spaced apart axially, so the sensor detects the magnetic field of the rotary encoder.

Alternatively, an optical system, for example a system with a laser, is preferably used for detecting the angular position. Alternatively, a sensor based on eddy currents is preferably used for detecting the angular position.

A vehicle controller is used in particular for the electronic control and/or regulation of one or more technical systems of the motor vehicle.

A vehicle controller particularly preferably has a wired or wireless signal input for receiving electrical signals, in particular, such as sensor signals. Furthermore, a vehicle controller likewise preferably has a wired or wireless signal output for the transmission of, in particular, electrical signals, for example to electrical actuators of the motor vehicle.

Both control operations and regulation operations can be carried out within the vehicle controller. It is very particularly preferable that the vehicle controller comprises hardware that is designed to run software. The vehicle controller preferably comprises at least one electronic processor for executing program sequences defined in software.

The vehicle controller can also have one or more electronic memories in which the data contained in the signals transmitted to the vehicle controller can be stored and read out again.

A vehicle controller can comprise a plurality of control devices, which are arranged in particular spatially separate from one another in the motor vehicle. Control devices are also referred to as electronic control units (ECU) or electronic control modules (ECM) and preferably have electronic microcontrollers for carrying out computing operations for processing data, particularly preferably using software. The control devices can preferably be networked with one another, so that a wired and/or wireless data exchange between control devices is made possible. In particular, it is also possible to network the control devices with one another via bus systems present in the motor vehicle, such as a CAN bus or LIN bus.

According to the disclosure, the signals that represent the angular position of the rotor at a bearing point are generated by the angular position sensor of a rolling bearing, and the signals that represent the angular positions are transmitted to the vehicle controller. From the difference in the angular positions, the vehicle controller determines the torque applied to the corresponding rotor and provides the determined torque for controlling and/or regulating the motor vehicle. For example, the torque determined can be used to avoid two electric motors acting independently of one another on the vehicle wheels of a drive axle, for example to avoid yawing of the motor vehicle when cornering. This is explained in more detail below with reference to the exemplary embodiments.

According to an advantageous embodiment, it is possible for the first electric motor to be operatively connected to a first vehicle wheel and a second vehicle wheel of a vehicle axle, so that the first electric motor drives the first vehicle wheel and the second vehicle wheel. The advantage of this embodiment is that a vehicle axle can be controlled in a very simple manner using only one electric motor.

Furthermore, according to a likewise advantageous embodiment, it is possible for each vehicle axle to a have a first electric motor and a second electric motor for driving one vehicle wheel each. The advantageous effect of this embodiment is based on the fact that very precise control of the driving dynamics and the driving properties of the vehicle can be realized.

According to a further particularly preferred embodiment, it is possible for a first vehicle axle to have a first electric motor and a second electric motor for driving one vehicle wheel each on the first vehicle axle, and for a second vehicle axle to have a third electric motor for driving both vehicle wheels on the second vehicle axle. As a result, the control of the driving characteristics of the motor vehicle can be further optimized since both vehicle axles can be controlled individually with respect to their torques.

According to another preferred further development as disclosed herein, it is also possible for the first electric motor to be operatively connected to a first vehicle wheel and for the device to also comprise a second electric motor having a second rotor, which is operatively connected to the second vehicle wheel of the vehicle axle, so that the first electric motor drives the first vehicle wheel and the second electric motor drives the second vehicle wheel, and wherein the second rotor is rotatably mounted in at least two rolling bearings that are spaced apart in the axial direction of the rotor, specifically a third rolling bearing and a fourth rolling bearing, wherein the third rolling bearing has a third angular position sensor and the fourth rolling bearing has a fourth angular position sensor, each of which generates a signal representing the angular position of the second rotor at a bearing point, and the signals representing the angular positions are transmitted to a vehicle controller in which the torque of the second electric motor applied to the second rotor is determined from the difference in the angular positions and is provided for controlling the motor vehicle.

This achieves the fact that the torques on each electrically driven vehicle wheel are individually detected and consequently each of the vehicle wheels can also be controlled individually with respect to its torques.

Furthermore, the disclosure can also be further developed such that the first rolling bearing and the second rolling bearing are arranged inside the first electric motor. The advantage of this configuration is that a particularly compact electric motor unit is formed.

In a likewise preferred embodiment, it is also possible for the first rolling bearing to be arranged inside the first electric motor and for the second rolling bearing to be arranged outside of the first electric motor, in particular in or on a vehicle wheel. This achieves an improvement of the sensitivity or accuracy of the torque determination by the greatest possible axial spacing of the rolling bearings with their angular position sensors.

It can also be advantageous to further develop the disclosure in such a way that the vehicle axle has a differential gear, via which the vehicle wheels of the vehicle axle are operatively connected to the electric motor. The advantage that can be achieved in this way is that the drive of two vehicle wheels of a vehicle axle can be realized with one electric motor.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
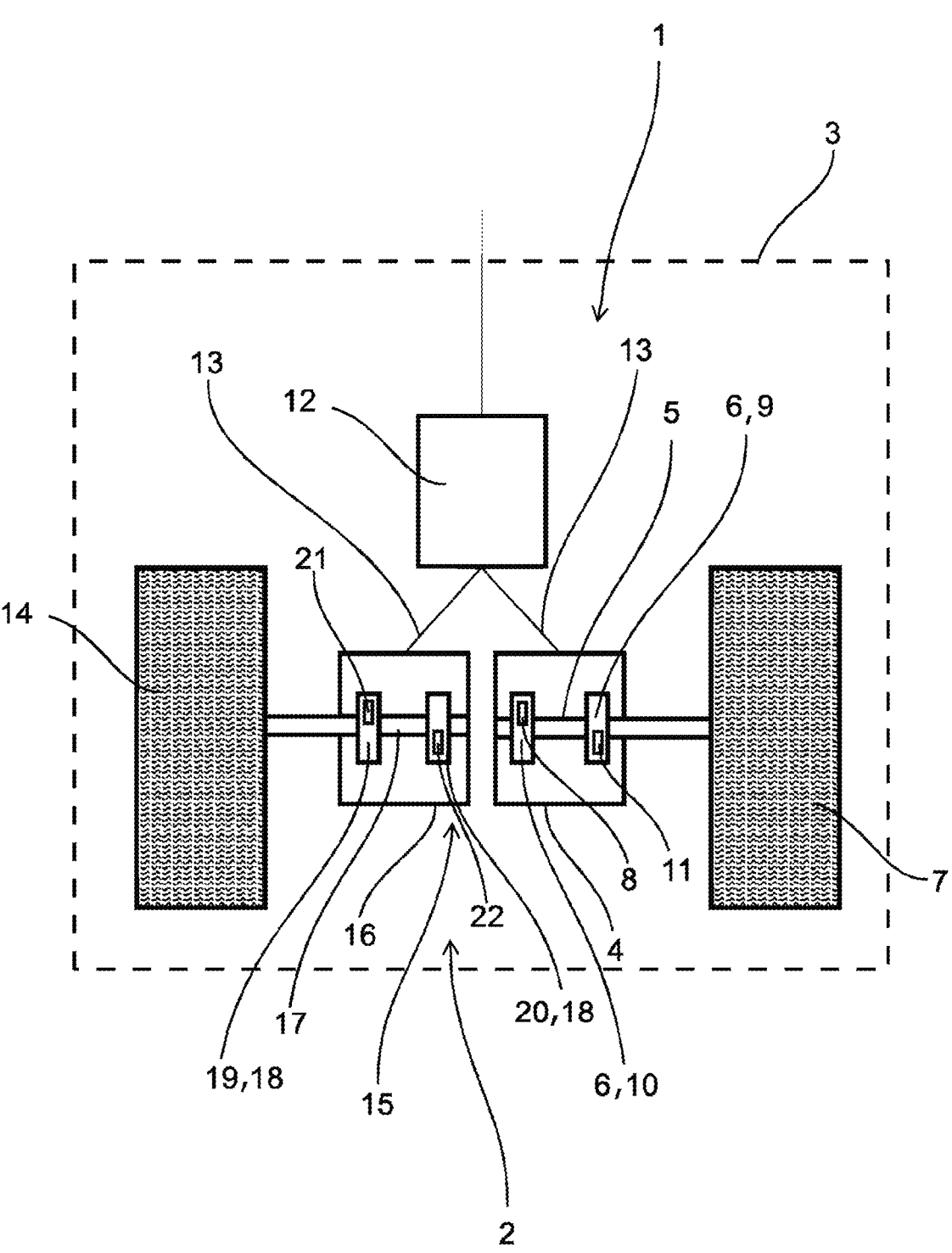
FIG. 1 shows a first embodiment of a device according to the disclosure for determining a torque in a drivetrain of an at least partially electrically operated motor vehicle in a schematic block diagram.

FIG. 1 shows a device 1 for determining a torque in a drivetrain 2 of an at least partially electrically operated motor vehicle 3. In the embodiment shown, the device 1 comprises a first electric motor 4 with a first rotor 5, the first rotor 5 being rotatably mounted in two rolling bearings 6 that are mutually spaced in the axial direction of the rotor 5, specifically a first rolling bearing 9 and a second rolling bearing 10. The first rotor 5 of the first electric motor 4 is operatively connected to a first vehicle wheel 7 so that the first electric motor 4 drives the first vehicle wheel 7.

The first rolling bearing 9 has a first angular position sensor 8 and the second rolling bearing 10 has a second angular position sensor 11, each of which generates a signal 13 representing the angular position of the first rotor 5 at a bearing point. The signals 13 representing the angular positions are transmitted to a vehicle controller 12 in which the torque of the first electric motor 4 applied to the first rotor 5 is determined from the difference in the angular positions and is provided for controlling the motor vehicle 3.

The device 1 also comprises a second electric motor 16 having a second rotor 17, which is operatively connected to the second vehicle wheel 14 of the vehicle axle 15, so that the first electric motor 4 drives the first vehicle wheel 7 and the second electric motor 16 drives the second vehicle wheel 14 independently of one another. The second rotor 17 is also rotatably mounted in two rolling bearings 18 that are mutually spaced in the axial direction of the rotor 17, specifically a third rolling bearing 19 and a fourth rolling bearing 20. The third rolling bearing 19 also has a (third) angular position sensor 21 and the fourth rolling bearing 20 has a fourth angular position sensor 22, each of which generates a signal 13 that represents the angular position of the second rotor 17 at a bearing point. The signals 13 representing the angular positions are also transmitted to the vehicle controller 12, in which the torque of the second electric motor 16 applied to the second rotor 17 is determined from the difference in the angular positions and is provided for controlling the motor vehicle 3.

As shown in FIG. 1, in the embodiment shown, the vehicle axle 15 has a first electric motor 4 and a second electric motor 16 for each driving one vehicle wheel 7, 14. It is understood that, similarly to the embodiment shown, there can also be a second vehicle axle which also has individually electrically drivable vehicle wheels.

The Figure also shows that the first rolling bearing 9 and the second rolling bearing 10 are arranged inside the first electric motor 4. The same applies analogously to the second electric motor 16.

Figure 2:
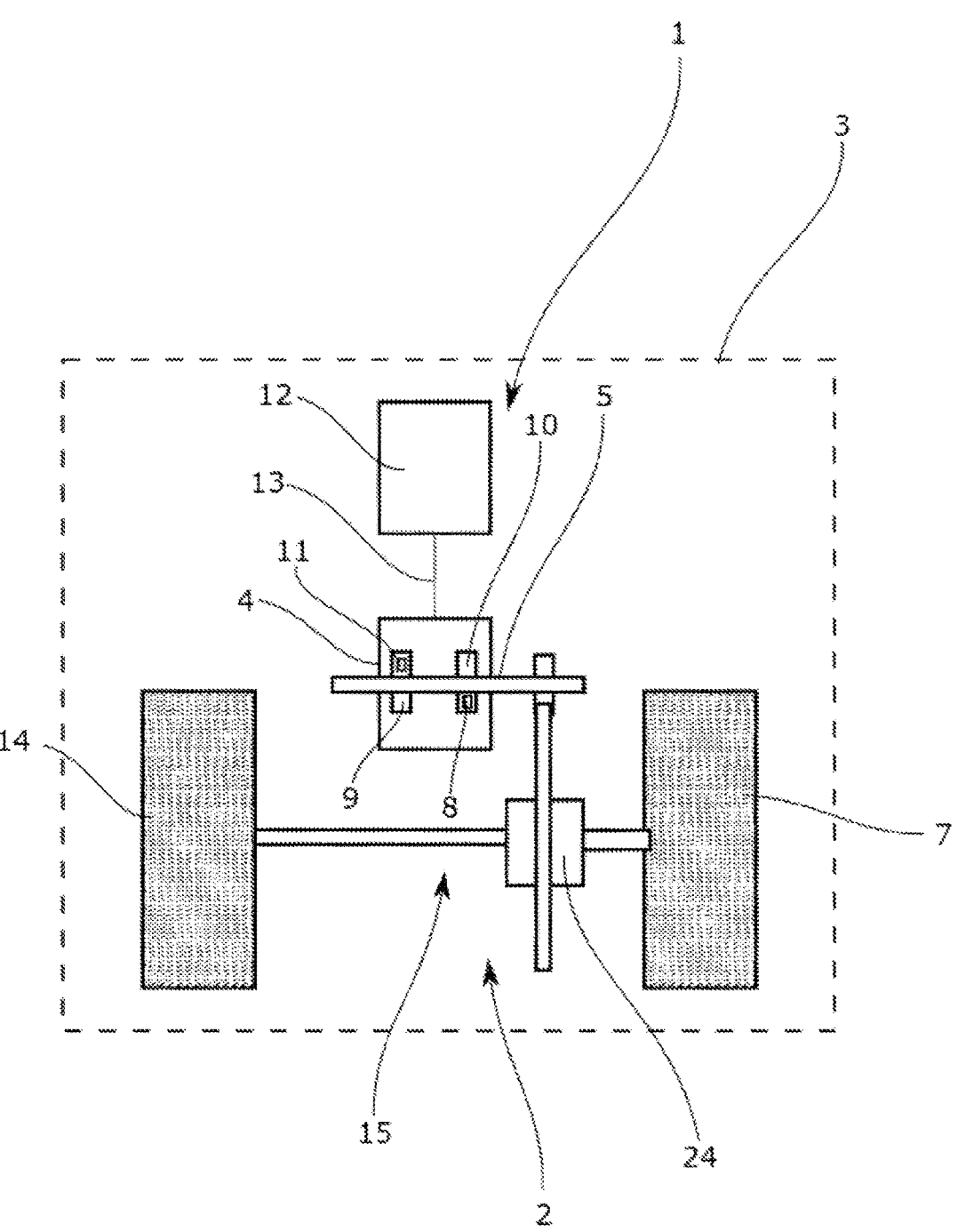
FIG. 2 shows a second embodiment of a device according to the disclosure for determining a torque in a drivetrain of an at least partially electrically operated motor vehicle in a schematic block diagram.

FIG. 2 shows a second embodiment of a device 1 according to the disclosure for determining a torque in a drivetrain 2 of an at least partially electrically operated motor vehicle 3, in which the two vehicle wheels 7, 14 of a vehicle axle 15 are driven by an electric motor 4. The first electric motor 4 is operatively connected to a first vehicle wheel 7 and a second vehicle wheel 14 of a vehicle axle 15 so that the first electric motor 4 drives the first vehicle wheel 7 and the second vehicle wheel 14. This is realized in that the vehicle axle has a differential gear 24 via which the vehicle wheels 7, 14 of the vehicle axle 15 are operatively connected to the electric motor 4. As already known from the exemplary embodiment in FIG. 1, the rotor 5 is mounted in the rolling bearings 9, 10 provided with angular position sensors 8, 11, such that the torque applied to the rotor 5 can be determined via the vehicle controller 12. As in the embodiment of FIG. 1, the rolling bearings 9, 10 are also arranged within the electric motor 4 in the configuration shown in FIG. 2.

Figure 3:
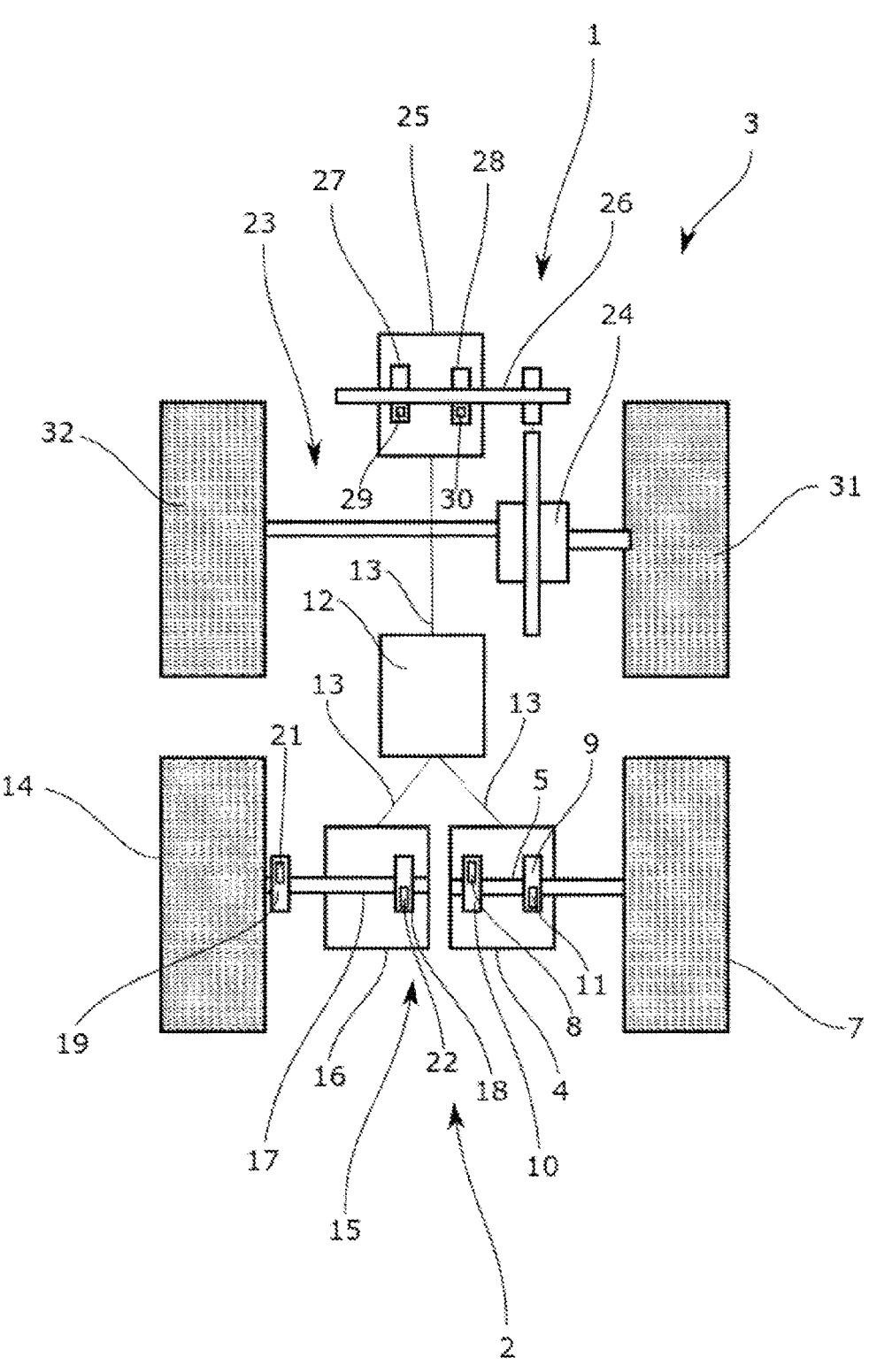
FIG. 3 shows a third embodiment of a device according to the disclosure for determining a torque in a drivetrain of an at least partially electrically operated motor vehicle in a schematic block diagram.

FIG. 3 shows a further embodiment of a device 1 according to the disclosure for determining a torque in a drivetrain 2 of an at least partially electrically operated motor vehicle 3, in which a first vehicle axle 15 has a first electric motor 4 and a second electric motor 16 for each driving one vehicle wheel 7, 14 of the first vehicle axle 15 and a second vehicle axle 23 has a third electric motor 25 for driving both vehicle wheels 31, 32 of the second vehicle axle 23. The three rotors 5, 17, 26 are each mounted via rolling bearings 9, 10, 19, 20, 27, 28 provided with angular position sensors 8, 11, 21, 22, 29, 30 so that the torque present on all of the three rotors 5, 17, 26 in each case—as already explained in the exemplary embodiments for FIG. 1 and FIG. 2—can be determined individually.

FIG. 3 shows another possible arrangement of the rolling bearings, in which the first rolling bearing 18 is arranged inside the first electric motor 16 and the second rolling bearing 19 is arranged outside the first electric motor 16 on a vehicle wheel. Other options for arranging the rolling bearings are outlined in FIG. 4. Here, for example, in the case of the electric motor 25, the rolling bearing 27 is positioned inside the vehicle wheel 32.

It is of course possible to freely combine the arrangement of the rolling bearings between the exemplary embodiments shown.

Figure 4:
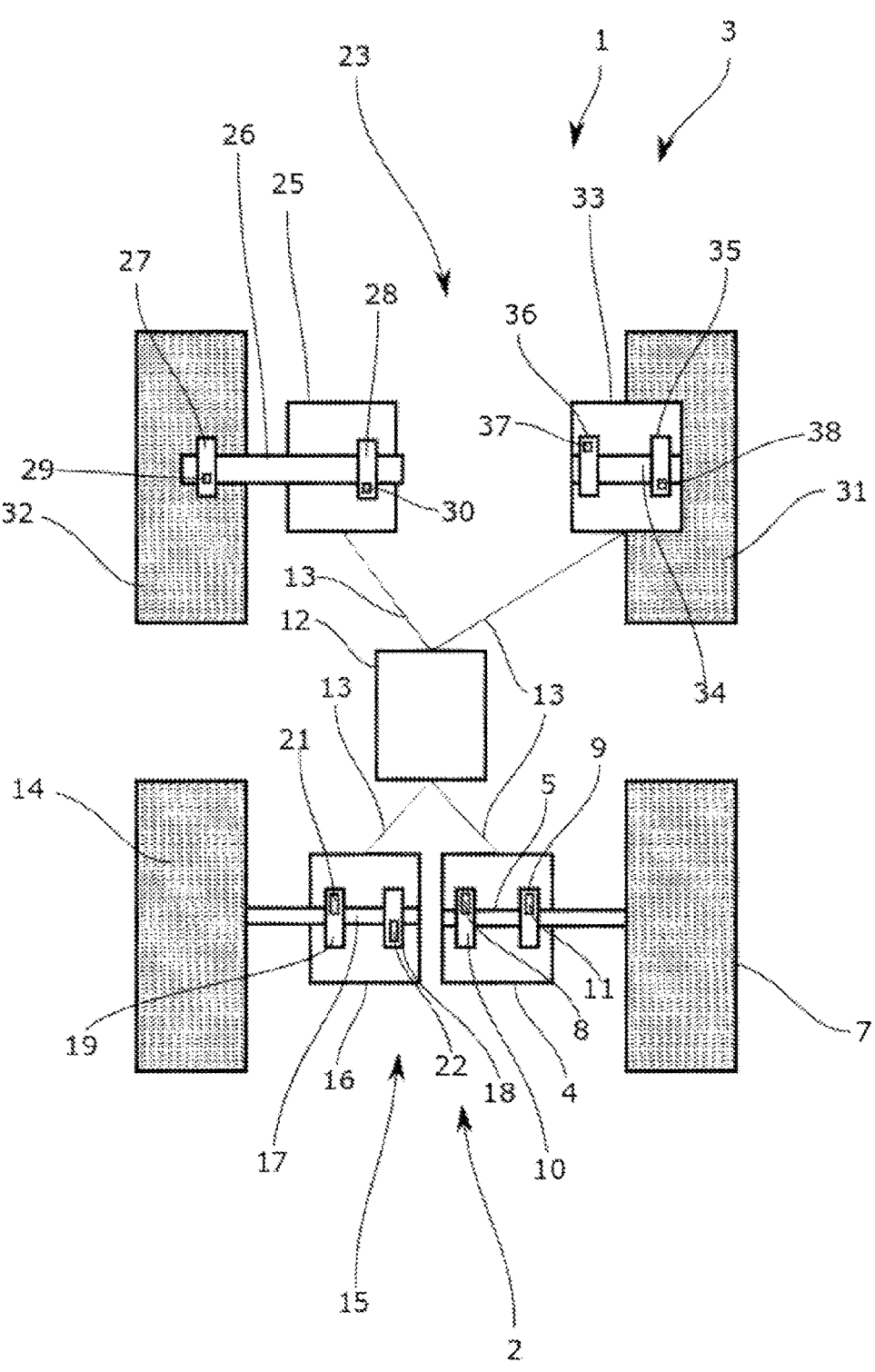
FIG. 4 shows a fourth embodiment of a device according to the disclosure for determining a torque in a drivetrain of an at least partially electrically operated motor vehicle in a schematic block diagram.

Finally, FIG. 4 shows a further embodiment of a device 1 according to the disclosure for determining a torque in a drivetrain 2 of an at least partially electrically operated motor vehicle 3, in which each vehicle wheel 7, 14, 31, 32 can be operated individually by an electric motor 4, 16, 25, 33. The configuration of the vehicle axle 15 is already known from FIG. 1, so there is no need to go into more detail here. FIG. 4 also shows that an electric motor 33 can be configured as a wheel hub motor, which is arranged inside or on the vehicle wheel 31.

In the embodiment shown, all the rotors 5, 17, 26, 34 are mounted in rolling bearings, of which at least two rolling bearings have an angular position sensor so that the torque applied to the rotors 5, 17, 26, 34 can be determined.

The disclosure is not limited to the embodiments shown in the figures. The above description is therefore not to be regarded as limiting, but rather as explanatory. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SIGNS

1 Device
2 Drivetrain
3 Motor vehicle
4 Electric motor
5 Rotor
6 Rolling bearing
7 Vehicle wheel
8 Angular position sensor
9 Rolling bearing
10 Rolling bearing
11 Angular position sensor
12 Vehicle controller
13 Signal
14 Vehicle wheel
15 Vehicle axle
16 Electric motor
17 Rotor
18 Rolling bearing
19 Rolling bearing
20 Rolling bearing
21 Angular position sensor
22 Angular position sensor
23 Vehicle axle
24 Differential gear
25 Electric motor
26 Rotor
27 Rolling bearing
28 Rolling bearing
29 Angular position sensor
30 Angular position sensor
31 Vehicle wheel
32 Vehicle wheel
33 Electric motor

34 Rotor
35 Rolling bearing
36 Rolling bearing
37 Angular position sensor
38 Angular position sensor

The invention claimed is:

1. A device for determining a torque in a drivetrain of an at least partially electrically operated motor vehicle, the device comprising:

a first electric motor having a first rotor, the first rotor being directly mounted in at least first and second rolling bearings that are mutually spaced in an axial direction of the first rotor, and the first rotor of the first electric motor is connected to a first vehicle wheel so that the first electric motor drives the first vehicle wheel;

the first rolling bearing has a first angular position sensor;

the second rolling bearing has a second angular position sensor, wherein the first rolling bearing is arranged inside the first electric motor and the second rolling bearing is arranged outside the first electric motor and in or on a vehicle wheel; and each of the first and second angular position sensors generate a signal representing an angular position of the first rotor at a respective bearing point, and the signals representing the angular positions are transmitted to a vehicle controller that is configured to determine the torque of the first electric motor which is applied to the first rotor from a difference in the angular positions and the torque is provided for controlling the motor vehicle.

2. The device according to claim 1, wherein the first electric motor is connected to the first vehicle wheel and a second vehicle wheel of a vehicle axle, so that the first electric motor drives the first vehicle wheel and the second vehicle wheel.

3. The device according to claim 1, wherein the first electric motor is connected to a first vehicle wheel and the device further comprises a second electric motor with a second rotor, which is connected to a second vehicle wheel of a vehicle axle, so that the first electric motor drives the first vehicle wheel and the second electric motor drives the second vehicle wheel, and the second rotor is mounted in third and fourth rolling bearings that are spaced apart in the axial direction of the second rotor, the third rolling bearing has a third angular position sensor and the fourth rolling bearing has a fourth angular position sensor, each of the third and fourth angular position sensors generates a signal representing an angular position of the second rotor at a bearing point, and the signals representing the angular positions of the second rotor are transmitted to the vehicle controller which is configured to determine a torque of the second electric motor applied to the second rotor from a difference in the angular positions and the torque is provided for controlling the motor vehicle.

4. The device according to claim 3, wherein one said first electric motor and one said second electric motor are coupled to a first vehicle axle for driving one vehicle wheel each, and another said first electric motor and another said second electric motor are coupled to a second vehicle axle for driving one vehicle wheel each.

5. The device according to claim 3, wherein the first electric motor and the second electric motor are coupled to a first vehicle axle for driving one vehicle wheel each on the first vehicle axle, and a third electric motor is coupled to a second vehicle axle for driving both vehicle wheels on the second vehicle axle.

6. The device according to claim 1, wherein the first electric motor is on a vehicle axle having a differential gear, wherein vehicle wheels of the vehicle axle are connected to the first electric motor through the differential gear.

7. A device for determining a torque in a drivetrain of an at least partially electrically operated motor vehicle, the device comprising:

a first electric motor having a first rotor, the first rotor being mounted in at least first and second rolling bearings that are mutually spaced in an axial direction of the first rotor, and the first rotor of the first electric motor is connected to a first vehicle wheel so that the first electric motor drives the first vehicle wheel;

the first rolling bearing has a first angular position sensor;

the second rolling bearing has a second angular position sensor, wherein the first rolling bearing is arranged inside the first electric motor and the second rolling bearing is arranged outside the first electric motor and in or on a vehicle wheel; and each of the first and second angular position sensors generate a signal representing an angular position of the first rotor at a respective bearing point, and the signals representing the angular positions are transmitted to a vehicle controller that is configured to determine the torque of the first electric motor which is applied to the first rotor from a difference in the angular positions and the torque is provided for controlling the motor vehicle.

* * * * *